United States Patent Office 3,259,537
Patented July 5, 1966

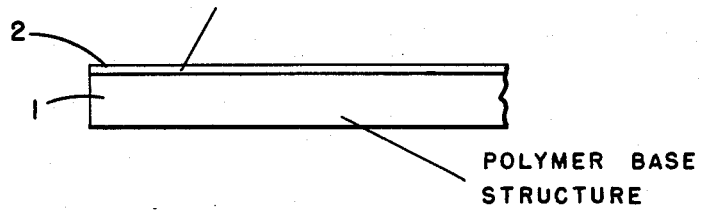

3,259,537
POLYMER SURFACES HAVING A COATING OF CELLULOSE CRYSTALLITE AGGREGATES
Orlando A. Battista, Drexel Hill, Pa., assignor, by mesne assignments, to FMC Corporation, San Jose, Calif., a corporation of Delaware
Filed Aug. 3, 1962, Ser. No. 214,646
18 Claims. (Cl. 161—267)

This invention relates to coatings or deposits on certain polymer bases or surfaces and to the resulting coated structures, and it provides various and sundry advantages. As will be described in detail, the coatings may be protective or decorative, or may serve to laminate a pair of adjacent surfaces or structures, or may improve a given surface as by making it smooth, or rendering it non-blocking, or abrasion resistant, or more compatible for subsequent other coatings, etc.

This application is a continuation-in-part of application Serial No. 836,320, filed August 27, 1959, now abandoned, and of application Serial No. 10,072, filed Feb. 23, 1960, now Patent No. 3,157,518 which is a continuation-in-part of Serial No. 636,639, filed Jan. 28, 1957, now abandoned.

In essence, the invention contemplates a polymer structure or base material having on at least one surface thereof an adherent coating or deposit of mechanically disintegrated cellulose crystallite aggregates that are characterized by having an average level-off D.P. (degree of polymerization) or if certain derivatives of cellulose crystallite aggregates. The invention is based upon the discovery that disintegrated cellulose crystallite aggregates and certain disintegrated aggregates derivatives form self-adherent continuous coatings on certain polymer surfaces from stable dispersions or suspensions of such substances in a suitable liquid medium upon application of a dispersion to the polymer surface and upon evaporation or volatilization of the liquid.

Cellulose crystallite aggregates are small disintegrated aggregates of level-off D.P. cellulose. These small disintegrated aggregates, their properties and a method of disintegrating the level-off D.P. cellulose are described in United States Patent 2,978,446, issued April 4, 1961. They are acid-insoluble products produced by the controlled acid hydrolysis of cellulose and the level-off D.P. value reflects a destruction of the original fibrous structure of the cellulosic source material. The term "level-off D.P." has reference to the average level-off degree of polymerization of the cellulose product measured in accordance with the paper by O. A. Battista entitled "Hydrolysis and Crystallization of Cellulose," vol. 42, Industrial and Engineering Chemistry, pages 502–7 (1950).

As described in the foregoing patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5%) hydrochloric acid solution at 121° C. under pressure for 1 hour. In accordance with the method as described in the patent, the insoluble residue is preferably washed free of acid.

The cellulose crystallite aggregates which are recovered from the hydrolysis treatment have a particle size in the range of from 1 or 2 microns to about 300 microns as determined visibly by microscopic examination and may be designated as "as-formed cellulose crystallite aggregates." As described in the patent, by subjecting a mass of crystallite aggregates to a mechanical disintegration so as to produce a mass of disintegrated aggregates wherein at least about 1% of the cellulose crystallite aggregates, by weight, have a particle size less than about 1 micron, the disintegrated mass is capable of being colloidally suspended in aqueous media; that is, the mass is characterized by forming a stable suspension in aqueous media.

The source material for the cellulose crystallite aggregates may be any of the natural cellulose materials, such as natural fibers, for example, ramie, cotton, purified cotton, purified wood pulps such as bleached sulfite pulp, bleached sulfate pulp, etc., or regenerated forms of cellulose, for example, rayon, cellophane, etc., and in all instances has an actual D.P. greater than its average level-off D.P. The aggregates may have an average level-off D.P. value in the range of from about 15 to about 375 anhydroglucose units and the specific value will be dependent upon the source material. Aggregates having an average level-off D.P. in the range of 15 to 60, for example, are produced from regenerated forms of cellulose. Aggregates having an average level-off D.P. in the range of 60 to 125 may be obtained from alkali swollen natural forms of cellulose such as cotton linters and purified wood pulps. Sulfite pulp as a source material will produce cellulose crystallite aggregates having an average level-off D.P. in the range of 200 to 300. Although the cellulose chains in the crystallites are uniform in length by comparison with the source material, some variation occurs, and, for this reason, the D.P. is referred to as an average level-off D.P. value.

In accordance with recognized principles of polymer chemistry, in speaking of degree of polymerization (D.P.), reference is made to the pure polymer. It is to be understood that the stated level-off D.P. values of the cellulose has reference to substantially pure cellulose such as cellulose crystallites derived from highly purified cellulose sources including regenerated forms of cellulose. Where a crude or raw wood pulp is subjected to a hydrolysis treatment for the production of the level-off D.P. cellulose crystallites, appreciable amounts of lignin and other non-cellulose materials will be present in the residue and measurements of average level-off D.P. of such residue may exhibit apparent values as high as 500. Such high values reflect the presence of lignin and other non-cellulose material and are not true values of the level-off D.P. of the cellulose per se. However, there is present in the mass some cellulose which has been reduced to the average level-off D.P.

Derivatives of cellulose crystallite aggregates which are essentially topochemical derivatives possess physical characteristics and properties similar to those of cellulose crystallite aggregates. For example, the derivatives have about the same D.P. and a size in the same particle size range as the crystallite aggregates from which they have been formed, and the disintegrated derivatives have dispersibility and gel-forming characteristics similar to those of the disintegrated cellulose crystallite aggregates. Chemically, the degree of substitution (D.S.) at least 0.01. The D.S. has reference to the total degree of substitution which may include both hydrophilic and hydrophobic substituents. The derivatives may be formed from disintegrated cellulose crystallite aggregates and will have a particle size ranging from below 1 micron to about 250 microns depending directly upon the particle size of the aggregates. Alternatively, the derivatives may be formed from non-disintegrated aggregates and subsequently disintegrated. Where the D.S. is sufficiently low so that the derivatives are water-insoluble and/or organic solvent-insoluble, the disintegrated aggregates derivatives have a unique and distinguishing characteristic, like that of the disintegrated cyrstallite aggregates, in their ability to form stable dispersions in non-solvent liquid media, which media is capable of partially swelling the disintegrated aggregates, providing that the derivatives constitute at least about 0.5% by weight of the dispersion and at least 1% of the weight of the dispersed aggregates derivatives have a particle size not exceeding about 1 micron.

The derivatives containing hydrophilic substituents are water-sensitive and the ease with which aqueous dispersions or suspensions may be formed is dependent directly on the water-sensitivity of the derivative. For example, a stable aqueous dispersion of a water-insoluble hydroxyethyl derivative may be formed more easily and readily than a corresponding stable dispersion or suspension of the cellulose crystallite aggregates because the hydroxyethyl cellulose is more sensitive to water than the cellulose crystallites themselves. The appearance and nature of the dispersion or suspension will also vary with the water-sensitivity of the derivative. Where the D.S. of a derivative having a hydrophilic substituent is not more than about 0.1 to about 0.2, the dispersion of the disintegrated derivatives will have about the same appearance as a corresponding dispersion of disintegrated cellulose crystallite aggregates. For example, dispersions or suspensions of disintegrated sodium carboxymethyl or hydroxypropyl derivatives of the aggregates having a D.S. of about 0.1 have the same white glistening appearance as a corresponding dispersion of the disintegrated aggreages. As the D.S. of the disintegrated derivative is increased, as for example to a D.S. of about 0.3, the dispersion has a more translucent appearance and where the D.S. is about 0.4, the dispersion has an appearance approaching that of white petrolatum.

Where the aggregates derivatives contain hydrophobic substituents, the disintegrated derivatives may be dispersed or suspended in various organic solvent systems in which they are insoluble but in which they are partially swollen. In forming stable dispersions of this group of derivatives, the ease of formation of a stable dispersion or suspension will vary with the sensitivity of the derivative to the organic solvent and the appearance of the dispersions will vary with the degree of substitution in a manner similar to that of the aqueous dispersions of the water-sensitive derivatives. For example, a stable dispersion (1%) of the disintegrated acetate derivative (D.S.—2.0) may be formed in acetone. Similarly, a stable dispersion of 1% (by weight) ethyl cellulose (D.S.—1.5) may be formed in methyl ethyl ketone.

A wide range of derivatives of the cellulose crystallite aggregates are satisfactory for the purposes of this invention and these derivatives are disclosed in copending application Serial No. 2,133, now Patent No. 3,111,513, dated November 19, 1963, Serial No. 2,134 now abandoned and Serial No. 2,135, now abandoned, all filed January 13, 1960. These derivatives include, for example, oxidation derivatives containing 1 or more carbonyl linkages including aldehyde, carboxyl and mixed aldehyde-carboxyl derivatives; ether derivatives characterized by having one or more —OR groups where R may be an aliphatic or substituted aliphtic radical, either a straight or branched chain containing from 1 to 12 or more carbon atoms, an aryl or aralkyl or substituted aralkyl radical or a carboxyalkyl, hydroxyalkyl, cyanoalkyl, alkoxyalkyl, arylkyloxyalkyl, or a dialkylaminoalkyl radical; and ester derivatives, for example, esters of inorganic acids such as the nitrates, nitrites, thiocyanates and phosphates and esters of organic acids such as the formates, acetates, propionates, butyrates, mixed acetate-propionates, mixed acetate-butyrates, mixed acetate-propionates, mixed acetate-butyrates, other aliphatic acid derivatives containing up to 18 or more carbon atoms and aryl or aralkyl esters such as, for example, benzoates, phenyl acetate esters, phthalate esters, naphthonates and the like.

For the purposes of the present invention, the cellulose crystallite aggregates and the water-insoluble and/or organic-solvent insoluble aggregates derivatives having physical characteristics and properties similar to those of the cellulose crystallite aggregates are equivalents. In the succeeding discussion, the terms "cellulose crystallite aggregates" and "aggregates" is used to designate both the cellulose crystallite aggregates and the aggregates derivatives.

The base material or structure consists of a natural or synthetic organic polymeric substance containing some free polar groups along the polymer chain and the polymeric substance absorbs at least 0.5% water or moisture by weight when maintained under saturated equilibrium moisture conditions, that is, when maintained for 24 hours at 75° F. in an atmosphere having a relative humidity of 100%. Examples of this class of organic polymeric substance include natural polymers, such as cellulose materials, for example, wood, wood and other natural cellulosic fibers and structures produced from such fibers in the form of sheets, paper, molded paper and pulp structures, cork, cotton, ramie, flax, and other natural cellulosic fibers; synthetic cellulosic substances such as regenerated cellulose in the form of fibers, filaments, films and other shaped bodies and similar structures formed of cellulose derivatives, for example, cellulose esters and cellulose ethers. Further examples of natural polymers include proteinaceous materials in the form of fibers, films and other shaped structures such as animal hair, gelatin films, etc. Other organic polymers include polyesters, polyamides, polyvinyl resins, polycarbonates, polyurethanes, synthetic and natural elastomers or rubber, etc. in the form of fibers, non-fibrous and fibrous sheets or webs and other shaped or molded bodies.

The present invention provides a structure having a predetermined shape or configuration wherein at least the surface portion consists of a polymer base material as illustrated diagrammatically at 1 in the drawing and having on the polymer surface a self-adherent continuous coating 2 of disintegrated aggregates, that is, disintegrated cellulose crystallite aggregates or disintegrated water-insoluble and/or organic solvent-insoluble aggregates derivatives. The coating is formed by applying to the polymer surface in any desired manner a stable dispersion of the disintegrated aggregates in a liquid medium in which the disintegrated aggregates are insoluble but in which the disintegrated aggregates are partially swollen and drying or removing the liquid medium by allowing it to evaporate or volatilize. The film or coating which results is a self-adherent continuous coating but may be removed from the surface by washing the coated surface with the same liquid medium used in the applied dispersion. Upon removal of the film, the underlying surface remains unaffected.

As pointed out hereinabove, the aggregates are disintegrated in a liquid medium wherein the aggregates are insoluble but are partially swollen. The coatings are formed from dispersions containing at least about 0.5% by weight of disintegrated aggregates and at least 1% of the dispersed aggregates must have a particle size of not greater than about one micron. The upper limit of solids concentration in the coating material may be as high as desired being limited only by the capacity of the dispersion to be applied to the surface to form a relatively smooth continuous coating. Depending upon the quantity of aggregates particles under one micron in size, the coating may be in the form of a thixotropic gel having as low as about 3% by weight disintegrated aggregates. In general, however, gels will contain about 8% to 10% or more of the disintegrated aggregates and may range to about 30% by weight of the gel.

If desired, the disintegrated aggregates may be separated into fractions having a more homogenous particle size distribution. Thus, using such separation procedures as mechanical sifting, settling in water, or centrifuging, a number of useful fractions may be obtained, including (1) a fraction having a particle size of up to 0.2 micron, which produces very clear, transparent films from aqueous dispersions and gels having a wide range of pH, say pH 2 to 11; (2) a fraction having a size of up to 1 micron, from which colorless films are obtained over a pH range of about 4 to 10; (3) a fraction having a size of up to 2 microns which also produces colorless films over a pH range of about 4 to 10; (4) a fraction having a size of 1 to 5 microns, the films from which begin to show a slight haze, and the preferred pH range being about 6 to 10; (5) a 1 to 10 microns fraction which produces milky films from a dispersion or gel having a pH of about 6 to 10; (6) a fraction having a size range from 1 to more than 10 microns which produces opaque films from dispersions or gels having a somewhat higher pH, say pH 7 to 11. A desirable way of obtaining the foregoing fractions is to take the aqueous dispersion or gel, either of which may be termed a suspension, resulting from the mechanical disintegration step, dilute the same with water so that the content of aggregates is about 1% by weight or less, let the resulting suspension stand for several hours or until the upper layer has a smooth opalescent appearance, and then to separate such opalescent layer as by decanting. It will be found that the opalescent layer contains particles of up to 5 microns in size. To obtain fractions of smaller sizes, the opalescent layer may be centrifuged. Preferred fractions are those of particle sizes of up to 2 microns, that is, fractions (1), (2) and (3). Preferably, too, each dimension of the particles should be within the size range noted for each fraction; in other words, fraction (1), for example, should be made up of particles all of whose dimensions are up to 0.2 micron; however, particles having two dimensions within the size range are quite useful, as art particles having one dimension within the size range although they are less preferred. These considerations also apply to the other fractions described. The use of an unfractionated dispersion forms a smooth, flat white coating resembling a flat white paint coating.

The films or coatings produced from the foregoing fractions are all continuous; in particular, those obtained from the fractions of less than 1 micron size are further characterized by their homogeneity, and also by their toughness and adherence; thus, they cannot be scratched or removed by means of one's fingernail but rather require the use of a razor or other sharp blade for this purpose. All of the films are visible; and they are permeable to gaseous materials. It may be noted, in connection with the colorless or transparent films produced from particles of up to 1 or 2 microns, that the dispersions and gels of such particles are also colorless.

The properties of the films or coatings may be altered by incorporating in the dispersions or gels of the disintegrated aggregates other film-forming materials which are soluble in the particular medium. In general, the added film-forming polymers enhance the strength of the film and may increase the toughness of the film or coating as well as decrease the permeability to gases. For example, in forming films of water-insolube disintegrated aggregates, water-soluble film-forming materials such as carboxymethyl cellulose, methyl cellulose, polyvinyl alcohol, etc. may be dissolved in the water before forming the dispersion of the disintegrated aggregates. Similarly, in organic solvent systems, an organic solvent-soluble film-forming polymer may be dissolved in the organic solvent before forming the dispersion. Thus, in forming a coating composition in a water-acetone liquid wherein a disintegrated aggregates acetate is to be dispersed, a solvent-soluble cellulose acetate may be present. The addition of these soluble film-forming materials will also increase the smoothness of the final film or coating and form a more glossy surface. Such film-forming materials when added are preferably added in amounts up to about 10% but in specific instances may form up to about 20% of the dispersion particularly when the amount of disintegrated aggregates is 30% to 50% based on the weight of the coating liquid.

The coatings may be decorative, or protective and may be permanent or temporary. The coatings are of value as size and primer coats, for example, in that they are caple of smoothing out surface irregularities and tend to be more compatible with, and receptive to, subsequent coatings, like paint, then the surface on which they are laid down. Varying textual effects and/or opacities are obtainable by varying the particle size of the aggregates employed to form the dispersions and gels. By adding a wet strength cross-linking resin incorporating a self-contained catalyst to the aggregate dispersions or gels, and applying the resulting mixture to the polymer surface, there may be produced water-resistant films or coatings having increased permanence against moisture. Suitable resins are thermosetting amine-aldehyde resins of the type normally used for treating paper to impart wet strength, such as urea-formaldehyde and melamine-formaldehyde resins. It is preferred that the amount of resin shall be about 1% to 10% by weight, usually about 5%, based on the amount of the aggregates. The catalyst is a conventional one, comprising a salt, acid salt, or weak acid capable of catalzying the amine-aldehyde reaction; examples of preferred catalysts are ammonium chloride, monobasic ammonium phosphate, monobasic sodium or potassium sulfates, magnesium chloride (usually the hexahydrate), dibasic amonium phosphate, monobasic ammonium sulfate; also weak acids like lactic, citric, tartaric, oxalic, formic, propionic, boric, or succinic acids, or a combination of sodium chloride (2.0 to 10%) and tartaric acid (0.1 to 1.0%).

The aggregate dispersions and gels are satisfactory for masking selected areas on the polymer surfaces, thus permitting closely adjacent areas to be painted or coated or treated as desired. For example, a coating of aggregates may be applied to an area which is not to receive paint, after which paint is applied to the desired areas, and then, preferably when the paint is dry the coating of aggregates may be washed away with water. The aggregate coating thus functions as a temporary removable protective coating.

Cellophane and other polymer sheets may be made non-blocking by depositing thereon aggregate-containing films. It may be observed in this connection that ordinarily cellophane sheets, for example, particularly those coated with cellulose nitrate, or polyethylene, or polyvinylchloride type coatings, when stacked in sheet form, as in supermarkets where many items are wrapped in heat-sealing cellophane, tend to stick to each other. The operator normally has difficulty in separating one sheet from another because of the static charge on the sheets. By applying a dispersion of the aggregates to the cellophane and drying the same, sticking of the sheets to each other may be prevented.

Cellophane sheets, for example, may be laminated to one another by coating a surface of one sheet, or the mating surfaces of a pair of adjacent sheets, with a dispersion or gel of never-dried aggregates, preferably aggregates of one micron size or less. Upon drying the resulting structure, an excellent bond between the sheets is obtained. By plying the two sheets together so that their machine directions are angularly disposed to each other, say at right angles, there is obtained a laminated product of greatly improved tear strength. Besides cellophane, fibrous sheet materials such as paper and paperboard, and also other sheet materials, may be laminated in this way. Similarly, other polymer sheets may be laminated in the same manner. The laminant may also comprise the above-noted mixture of aggregates and the film-forming additive, or the aggregate-resin mixture.

Smooth, clear glass-like coatings on paper are producible by depositing the aggregates on a surface of the paper. For example, an aggregate-containing gel may be spread on the paper and then died while coincidently pressing the paper between a pair of smooth, preferably heated, metal plates. The gel dries down to form a very smooth, glossy, highly adherent coating, giving the paper improved tensile properties, both in the wet and dry state, and in other cases giving it a better writing surface and improved appearance. The increased tensile properties are brought about by the fact that the particles of the aggregates bond or coat the constitutent fibers of the paper at their crossing points. Paper coated with the crystallite aggregates is also of value as insulating material for use in paper capacitors. Reproduction paper may be made by incorporating an oil-based printing ink with the dispersion or gel and applying the resulting composition to one side of paper, and then drying, the resulting paper being suitable for reproducing writing or typing, serving, in other words, as a substitute for carbon paper. Grease resistance may be imparted to paper by the use of aggregates derivatives.

Another application of the aggregate coatings is in the treatment of synthetic and natural fibers and filaments having crenulated surfaces. Here, the dispersions or gels serve to fill up the crevices or troughs in the filament contour with a continuous film comprising very adherent particles, thus providing a filament having smooth surfaces. The concentration of the dispersion or gel, and the particle size of the aggregates, are easily determinable to correspond with the particular fiber or filament to be coated. Such a coated filament structure has a reduced loss of tensile strength which otherwise results when filaments having crenulated surfaces are twisted together. Another advantage is that the filaments having smooth surfaces, particularly when formed into a fabric such as a carpet or rug, are less apt to pick up dirt. Still another advantage resides in the increased facility of processing the filaments. It may be noted that in the case of regenerated cellulose filaments having crenulated cross-sections, the addition of the aggregates provides a resulting filament in which the aggregates and the filament are compatible.

In other applications, tacky materials like sheets or slabs of unvulcanized or slightly vulcanized rubber may be coated with an aqueous dispersion of the aggregates, and after drying, the sheets may be stacked without having them adhere to each other. Sheets or other shapes of cork can be given smooth surfaces by applying a dispersion or gel to the same and drying, the aggregate particles serving to fill the pores and crevices usually found in cork.

The thickness of the coatings or films may be varied depending upon the specific structure that is coated and the specific purpose of the coating. By way of illustration, the coatings may vary from about 0.0001 inch to 0.01 inch or more. For the thicker coatings, successive applications of the dispersions or gels may be applied, each coating being dried before the application of a succeeding coating. More concentrated dispersions, and of course gels, may be employed for the production of thicker films. The coating may cover the entire surface of an article or structure or any portion thereof, as may be desired. Colored coatings are conveniently made by adding a water-soluble or water-dispersible dye to the aqueous dispersion or gel from which the coating is to be formed. The aggregates accept dyes readily, and the dyed aggregates are applicable to any suitable polymer surface which is desired to be colored. Pigments as well as dyes are useful.

The invention may be illustrated by the following examples.

Example 1

A coating of transparent aqueous dispersion containing about 5% by weight of disintegrated cellulose crystallite aggregates of an average level-off D.P. of 220 and a partical size of the order of 1 micron or less was laid down on the surface of an uncoated wet gel cellophane film. The surface of another sheet of the same wet gel cellophane film was superimposed on this to form a lamination or sandwich, and the sheets were then dried down between smooth, heated platens. When dry, the two sheets of cellophane adhered together tenaciously and provided a completely transparent cellophane sandwich.

Example 2

Two sheets of uncoated dried commercial cellophane were taken. A coating of gel of the kind used in the preceding example was deposited on the surface of one of the sheets. The sandwich was completed by superimposing the other sheet of cellophane, and the sandwich was then dried in the platens as used in the preceding example. A clear sandwich resulted in which the two sheets of cellophane were tenaciously bonded to each other.

Example 3

A butter-like, glistening white gel containing 85% water and 15% by weight of disintegrated cellulose crystallite aggregates having an average level-off D.P. of about 220 was prepared from "as-formed" cellulose crystallite aggregates. Sheets of bond paper were coated with the gel and the coated sheets then dried between smooth heated metal platens. The resulting coating gave the paper a glass-like or glossy surface as though a sheet of cellophane had been fused to it. The coating was quite tenaciously held by the paper and did not peel off or flake.

Example 4

Using the same kind of gel and paper as in Example 3, two sheets of paper were coated and the coated surfaces brought together and dried between platens. Excellent adhesion of the sheets to give a paper sandwich resulted.

Example 5

The experiment of Example 4 was repeated except that the gel also contained 0.2% by weight, gel basis, of carboxymethylcellulose (CMC). A very effective sandwiching of the paper was obtained, the tenacity of which was greater than in the case of Example 4.

Example 6

200 g. of air dried cellulose crystallite aggregates containing particles of the order of 10 microns or less were allowed to absorb 120 g. of the type of oils that are normally used in the preparation of printing inks. The resulting mixture was dispersed in 800 g. of water in a Waring Blendor until a uniform heavy colloidal dispersion was formed. At the same time, an oil soluble dye was dispersed in the colloidal dispersion to provide a desired color. The resulting mixture was then coated on paper as a very thin coating, which on drying down provided a surface on the paper in which there were distributed particles of the disintegrated aggregates on which were absorbed the oil based printing ink. Such a sheet of paper was used by placing the coated side down on another sheet of paper as a method of producing copies without carbon paper. The pressure of a pen or pencil forced the oil plus dye or ink out of the crystallite aggregates onto the sheet of paper to form a desired copy.

Example 7

A gel as used in Example 3 was prepared containing 15% of the aggregates and to it there was added approximately 10% by weight of linseed oil. This mixture was used to coat paper, and the resulting coating was allowed to dry down on the paper. The coated paper was found to hold the oil quite well in that the paper was not oily, either visibly or to the touch. Of particular interest was the fact that it acted in a sense similar to carbonless types of pressure-sensitive copying paper. Upon writing on the coated paper with either pencil or pen while keeping a sheet of paper under it during the writing, a clear reproduction, in oil, of the writing was obtained on the undersheet. The same result was obtained when an oil-soluble red dye was included in the gel-linseed oil mixture, except that the writing on the undersheet was colored red. The crystallite aggregates in the coating held the oil so that under the localized pressure of the writing instrument a part of the oil was released from the aggregates and transferred to the undersheet. With the dye present in the coating, the dye was also transferred to the undersheet to give a direct, high contrast, clear detail copy or reproduction of the writing.

In Example 7, in place of linseed oil, other non-volatile transferable agents, or vehicles, may be employed, such as alkyd, phenol, modified alkyd-phenolic vehicles, and various resin-solvent combinations as used in conventional printing inks. Conventional solvents, oils, and driers may be incorporated in the vehicle. The coloring material may be of any suitable kind, including water-soluble and oil-soluble dyes, and also conventional pigments. It is considered that the linseed oil or other non-volatile agent or vehicle is sorbed on the crystallite aggregates, that is, it is both adsorbed and absorbed on the aggregates. As indicated, the crystallite aggregates may have a particle size in the range of less than 1 to 250 to 300 microns, preferably from less than 1 to 40 or 50 microns. The amounts of the aggregates, non-volatile agent, and coloring material are sufficient to provide a pressure transferable coating on the base sheet. Any graphic subject matter may be copied, including written, drawn and engraved matter. By written matter, it is intended to include typed and printed matter. If desired, the copying sheet may have a pressure-sensitive layer or coating on both sides, so that by placing a sheet over each coated side, two reproduced uncoated copies may be made.

*Example 8*

A stable dispersion was formed containing 5% by weight of ethyl cellulose (D.S. about 1.5) in methyl ethyl ketone. A coating of the dispersion was applied to a polyester film and the methyl ethyl ketone was allowed to evaporate and formed a self-adherent continuous coating of the ethyl cellulose. The polyester film was formed of an ethylene glycol-terephthalic acid polymer such as available commercially under the trade name "Mylar."

*Example 9*

A stable dispersion of ethyl cellulose was applied to a polyester film as described in Example 8. A second sheet of polyester film was superimposed on the coated film and the sandwich then placed between polished heated platens. When the methyl ethyl ketone was completely volatilized, the two sheets of film were tenaciously bonded together.

*Example 10*

A stable dispersion in water of a distintegrated sodium salt of a carboxylic acid derivative of cellulose crystallite aggregates (D.S. about 0.1) was formed containing 4% of the disintegrated derivative. A coating of the dispersion was applied to one surface of a paper web and after a partial drying the web was passed between heated calender rolls. The coated side of the paper had a smooth continuous coating illustrating that the interstices and pores, at least on and adjacent the surface of the paper, had been filled. The coating adhered tenaciously and could not be peeled from the paper. The coating enhanced the physical properties of the paper, such as tensile strength and tear resistance, and imparted a grease resistant characterictic to the paper.

The substitution in the foregoing examples of dispersions of disintegrated water-insoluble and/or organic solvent-insoluble aggregates derivatives having the properties and characteristics described hereinbefore for the specific dispersions of the examples forms similarly satisfactory products. For example, stable aqueous dispersions of water-insoluble hydroxyethyl cellulose and of water-insoluble hydroxypropyl cellulose may be substituted for the coatings of Examples 1, 3 and 6 to produce like products. Also, the stable dispersions of Examples 8 and 10, for example, may replace the aqueous dispersions of Examples 3 and 6. A stable dispersion of an acetate derivative (D.S. about 2.0) may replace the dispersions of Examples 3, 6 and 8.

While preferred embodiments of the invention have been shown and described, it is to understood that changes and variations may be made without departing from the spirit and scope of the invention as defined in the appended claims.

I claim:

1. As an article of manufcature, a shaped body, at least the surface of the body being formed of an organic polymer, and a self-adherent coating on the surface of the body, the organic polymer being characterized by having free polar groups along the polymer chain and by absorbing at least 0.5% moisture when maintained for 24 hours at 75° F. in an atmosphere having a relative humidity of 100%, the coating comprising a disintegrated substance selected from the group consisting of disintegrated cellulose crystallite aggregates, disintegrated water-insoluble derivatives of cellulose crystallite aggregates and disintegrated organic solvent-insoluble derivatives of cellulose crystallite aggregates, the cellulose crystallite aggregates having an average level-off D.P. in the range of from about 15 to 375 anhydroglucose units, the disintegrated substance having a particle size of from less than 1 micron to about 300 microns, at least 1% of the disintegrated substance having a particle size not greater than about 1 micron.

2. An article of manufacture as defined in claim 1 wherein the shaped body is a sheet of the organic polymer.

3. An article of manufacture as defined in claim 1 wherein the shaped body is a sheet of a nitrogen containing organic polymer.

4. An article of manufacture as defined in claim 1 wherein the shaped body is a sheet of a cellulosic material.

5. An article of manufacture as defined in claim 1 wherein the shaped body is a non-fibrous film of a cellulosic material.

6. An article of manufacture as defined in claim 1 wherein the shaped body is a non-fibrous film of regenerated cellulose.

7. An article of manufacture as defined in claim 1 wherein the shaped body is a fibrous sheet of cellulosic fibers.

8. An article of manufacture as defined in claim 1 wherein the shaped body is a filament of the organic polymer.

9. As an article of manufacture, a laminated body comprising a mating pair of surfaces of an organic polymer bonded together by an intermediate, self-adherent layer comprising a disintegrated substance selected from the group consisting of disintegrated cellulose crystallite aggregates, disintegrated water-insoluble derivatives of cellulose crystallite aggregates and disintegrated organic solvent-insoluble derivatives of cellulose crystallite aggregates, the cellulose crystallite aggregates having an average level-off D.P. in the range of from about 10 to 375 anhydroglucose units, the disintegrated substance having a particle size of from less than 1 micron to about 300 microns, at least 1% of the disintegrated substance having a particle size not greater than about 1 micron, the organic polymer being characterized by having free polar groups along the polymer chain and by absorbing at least 0.5% moisture when maintained for 24 hours at 75° F. in an atmosphere having a relative humidity of 100%.

10. An article of manufacture as defined in claim 9 wherein the laminated body comprises a pair of sheets of the organic polymer.

11. An article of manufacture as defined in claim 9 wherein the laminated body comprises a pair of sheets of a cellulosic material.

12. An article of manufacture as defined in claim 9 wherein the laminated body comprises a pair of non-fibrous films of a cellulosic material.

13. An article of manufacture as defined in claim 9 wherein the laminated body comprises a pair of non-fibrous films of regenerated cellulose.

14. An article of manufacture as defined in claim 9 wherein the laminated body comprises a pair of fibrous sheets of cellulosic fibers.

15. As an article of manufacture, a pressure-sensitive copying sheet for making direct, high-contact, clear detail copies of graphic subject matter comprising a sheet of an organic polymer and a self-adherent, pressure-sensitive, transferable coating on at least one surface of the organic polymer sheet, the organic polymer being characterized by having free polar groups along the polymer chain and by absorbing at least 0.5% moisture when maintained for 24 hours at 75° F. in an atmosphere having a relative humidity of 100%, the coating comprising a disintegrated substance selected from the group consisting of disintegrated cellulose crystallite aggregates, disintegrated water-insoluble derivatives of cellulose crystallite aggregates and disintegrated organic solvent-insoluble derivatives of cellulose crystallite aggregates, the cellulose crystallite aggregates having an average level-off D.P. in the range of from about 15 to 375 anhydroglucose units, the disintegrated substance having a particle size of from less than 1 micron to about 300 microns, at least 1% of the disintegrated substance having a particle size not greater than about 1 micron and a non-volatile transferable agent sorbed on the crystallite aggregates or derivatives of the crystallite aggregates.

16. An article of manufacture as defined in claim 15 wherein the sheet is a non-fibrous film of the organic polymer.

17. An article of manufacture as defined in claim 15 wherein the sheet is a fibrous sheet of cellulosic fibers.

18. An article of manufacture as defined in claim 15 wherein the transferable agent contains a coloring material.

References Cited by the Examiner

UNITED STATES PATENTS

| | | | |
|---|---|---|---|
| 2,335,126 | 11/1943 | Lilienfeld | 117—139.5 |
| 2,872,340 | 2/1959 | Newman et al. | 117—36.1 |

OTHER REFERENCES

McLaren: "The Adhesion of High Polymers to Cellulose—A Résumé," appearing at pp. 57–59 of Adhesion and Adhesives—Fundamentals and Practice, Society of Chemical Industry, London, 1954.

EARL M. BERGERT, *Primary Examiner.*

L. T. PIRKEY, M. L. KATZ, *Assistant Examiners.*